United States Patent
Yang et al.

(10) Patent No.: US 9,610,664 B2
(45) Date of Patent: Apr. 4, 2017

(54) FEEDING DEVICE AND MACHINE TOOL AND METHOD FOR MACHINING USING MACHINE TOOL

(71) Applicants: FU DING ELECTRONICAL TECHNOLOGY (JIASHAN) CO.,LTD., Zhejiang (CN); HON HAI PRECISION INDUSTRY CO., LTD., New Taipei (TW)

(72) Inventors: Ming-Lu Yang, New Taipei (TW); Tian-En Zhang, Jiashan (CN); Jian-Shi Jia, Jiashan (CN); Yang-Mao Peng, Jiashan (CN); Wei-Chuan Zhang, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 317 days.

(21) Appl. No.: 14/488,291

(22) Filed: Sep. 17, 2014

(65) Prior Publication Data
US 2015/0080197 A1  Mar. 19, 2015

(30) Foreign Application Priority Data

Sep. 17, 2013  (CN) .......................... 2013 1 0422857

(51) Int. Cl.
*B23Q 3/155* (2006.01)
*B23Q 3/157* (2006.01)
(Continued)

(52) U.S. Cl.
CPC ............ *B23Q 3/1554* (2013.01); *B23B 3/065* (2013.01); *B23B 11/00* (2013.01); *B23Q 1/012* (2013.01);
(Continued)

(58) Field of Classification Search
CPC ............ Y10T 29/5112; Y10T 29/5109; Y10T 29/511; Y10T 29/5111; Y10T 29/5113;
(Continued)

(56) References Cited

U.S. PATENT DOCUMENTS 4,596,502 A * 6/1986 Cattani ................... B23B 29/04
408/234
6,073,323 A * 6/2000 Matsumoto ............. B23B 3/161
29/27 C
(Continued)

FOREIGN PATENT DOCUMENTS

CN 202479801 U 10/2012
CN 202556095 U 11/2012
(Continued)

OTHER PUBLICATIONS

Machine Translation of CN-202556095-U, which CN '095 was published Nov. 2012.*

*Primary Examiner* — Erica E Cadugan
(74) *Attorney, Agent, or Firm* — Zhigang Ma

(57) ABSTRACT

A feeding device includes a sliding member, a main shaft, a tool holding assembly, a locking assembly, and a locking assembly. The sliding member is slidably couplable to a moving member. The main shaft is rotatably coupled with the sliding member. The tool holding assembly includes a connecting member detachably connectable to the main shaft and configured for holding one of a plurality of tool heads, the connecting member defining two clamping grooves. The locking assembly is positioned on the sliding member having a driving member attached to the sliding member, and a pair of claws attached to the driving member. The disclosure also supplies a machine tool using the feeding device, and a method for machining using the machine tool.

19 Claims, 5 Drawing Sheets

(51) Int. Cl.
*B23Q 1/01* (2006.01)
*B23Q 1/62* (2006.01)
*B23Q 5/20* (2006.01)
*B23B 11/00* (2006.01)
*B23P 23/02* (2006.01)
*B23B 3/06* (2006.01)
*B23B 29/04* (2006.01)

(52) U.S. Cl.
CPC ............ *B23Q 3/15513* (2013.01); *B23Q 5/20* (2013.01); *B23B 29/04* (2013.01); *B23Q 1/626* (2013.01); *Y10T 29/5107* (2015.01); *Y10T 29/5112* (2015.01); *Y10T 483/10* (2015.01); *Y10T 483/17* (2015.01); *Y10T 483/1705* (2015.01); *Y10T 483/1707* (2015.01); *Y10T 483/18* (2015.01)

(58) Field of Classification Search
CPC ............ Y10T 29/5114; Y10T 29/5115; Y10T 29/5105; Y10T 29/5107; Y10T 483/1705; Y10T 483/1707; B23Q 5/20; B23Q 3/155–3/15793

USPC ........ 29/27 A, 27 R, 28, 29, 27 B, 27 C, 30, 29/26 R, 26 A; 483/18–19
See application file for complete search history.

(56) References Cited

U.S. PATENT DOCUMENTS 8,814,769 B2 *   8/2014   Fujioka .................. B23B 29/04
                                                         29/27 A
9,364,899 B2 *   6/2016   Satou ..................... B23B 29/12

FOREIGN PATENT DOCUMENTS

| CN | 202779981 U |   | 3/2013 |
| EP | 259517 A1 | * | 3/1988 |
| EP | 2505285 A1 | * | 10/2012 |
| JP | 10-015715 A | * | 1/1998 |
| JP | 2001-293624 A | * | 10/2001 |
| JP | 2005-329493 A | * | 12/2005 |

* cited by examiner

FEEDING DEVICE AND MACHINE TOOL AND METHOD FOR MACHINING USING MACHINE TOOL

FIELD

The subject matter herein generally relates to a feeding device, a machine tool using the feeding device, and a method for machining a workpiece using the machine tool.

BACKGROUND

Machine tool is used for machining workpieces. Some workpieces need to be machined with different treatments, such as milling and lathing.

BRIEF DESCRIPTION OF THE DRAWINGS

Implementations of the present technology will now be described, by way of example only, with reference to the attached figures.

DETAILED DESCRIPTION

Figure 1:
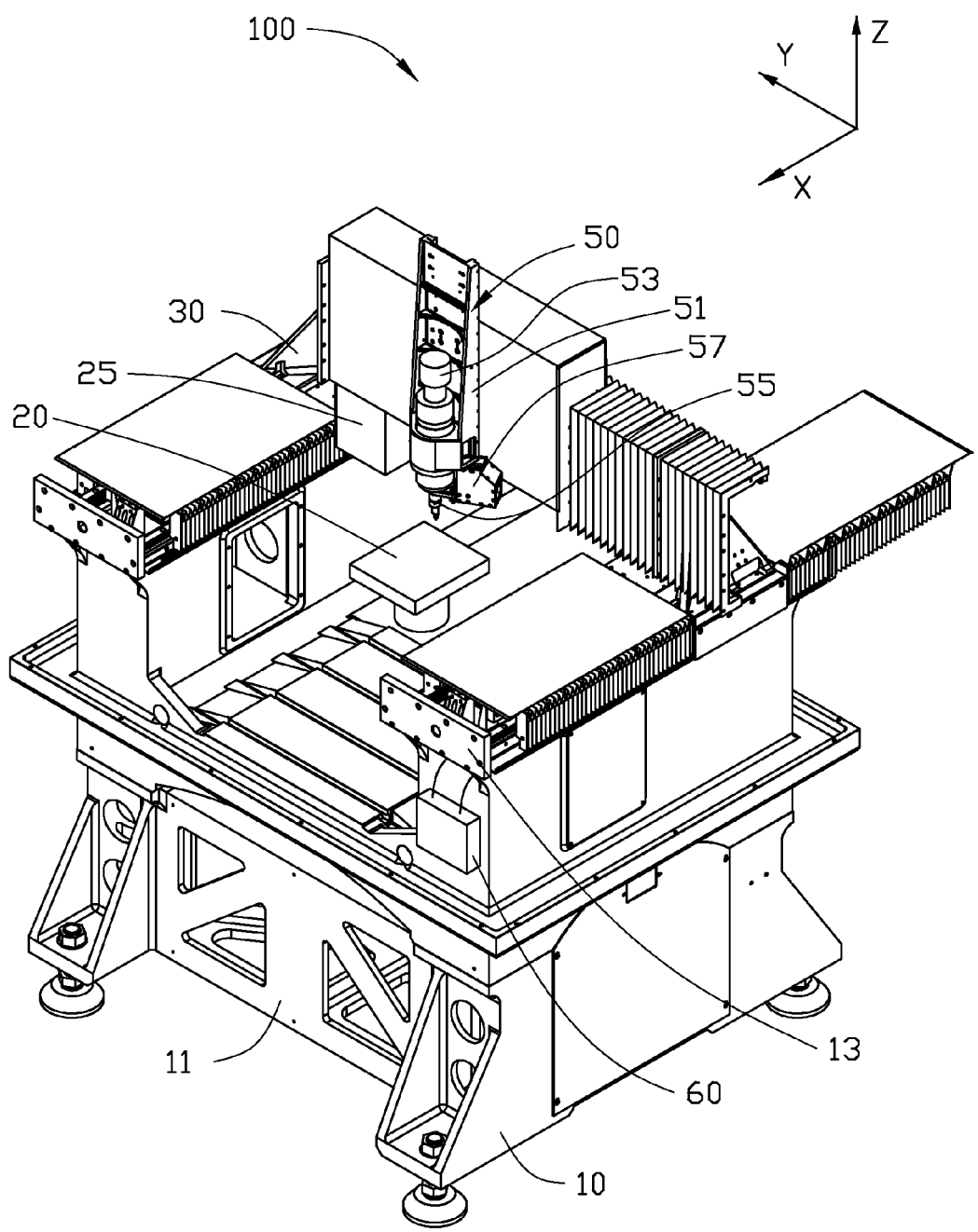
FIG. 1 illustrates an assembled, isometric view of one embodiment of a machine tool including a feeding device.
Figure 2:
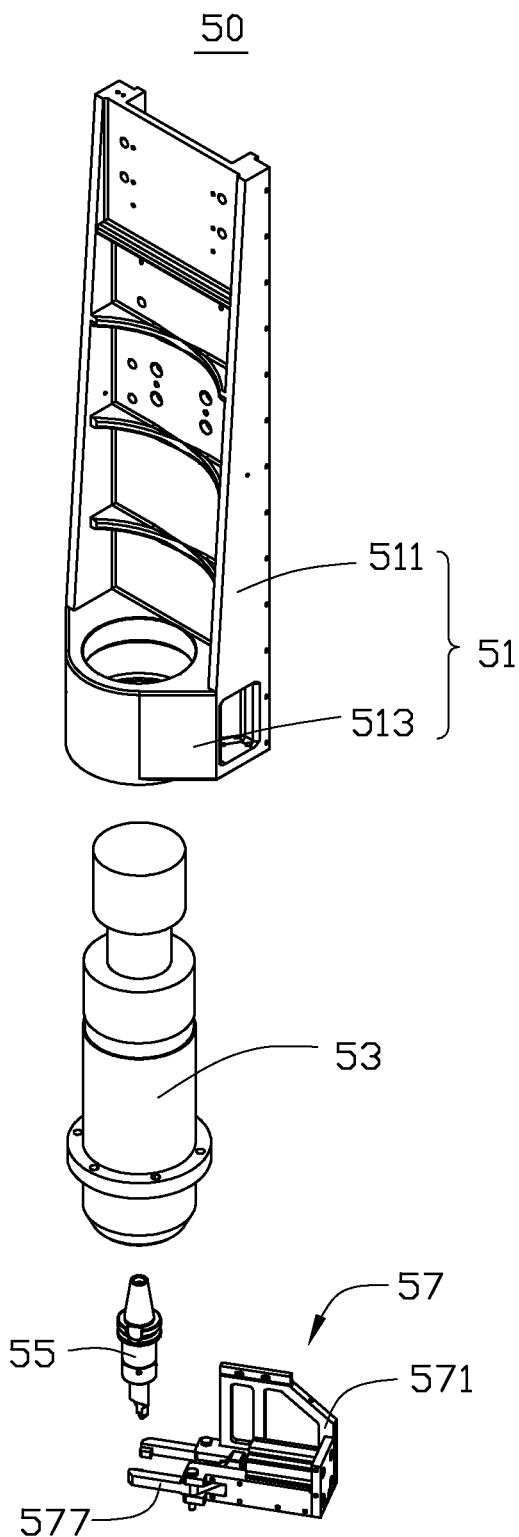
FIG. 2 illustrates an exploded view of the feeding device including a tool holding assembly and a locking assembly of FIG. 1.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

A feeding device can include a sliding member, a main shaft, a tool holding assembly, a locking assembly, and a locking assembly. The sliding member can be slidably couplable to a moving member. The main shaft can be rotatably coupled with the sliding member. The tool holding assembly can include a connecting member detachably connectable to the main shaft and configured for holding one of a plurality of tool heads, the connecting member defining two clamping grooves. The locking assembly can be positioned on the sliding member. The locking assembly can have a driving member attached to the sliding member and a pair of claws attached to the driving member. The driving member may move the pair of claws from an engaged position in which the pair of claws are engaged with the two clamping grooves of one of the plurality of tool heads to lock the tool head in place, to a released position in which the pair of claws are disengaged from the two clamping grooves releasing the tool head.

FIG. 1 illustrates a machine tool 100 of one embodiment. The machine tool 100 can include a machine bed 10, a worktable 20, a tool changer 25, a feeding device 50, and a controller 60. The worktable 20 can be rotatably positioned on the machine bed 10. The moving device 30 can be movably positioned on the machine bed 10 along a first direction X. The tool changer 25 can be positioned on one side of the moving device 30 towards the machine bed 10. The feeding device 50 can be sliadbly positioned on the moving device 30 along a second direction Y substantially perpendicular to the first direction X. The feeding device 50 can feed back and forth at high speed along a third direction Z substantially perpendicular to the first direction X and the second direction Y. The controller 60 can be positioned on the machine bed 10 and electrically coupled to the worktable 20, the moving device 30, and the feeding device 50. Under a control of the controller 60, the moving device 30 can move with the feeding device 30 and the tool changer 25 along the first direction X, the feeding device 50 can move along the second direction Y relative to the moving device 30, the feeding device 50 can feed back and forth along the third direction Z for machining, and the tool changer 25 can cooperate with the feeding device 30 to change a tool or a cutter.

The machine bed 10 can include a base 11 and two support bodies 13 positioned on the base 11. The two support bodies 13 can be substantially in parallel. The worktable 20 can be rotatably positioned on the base 11 between the two support bodies 13 for positioning and rotating a workpiece (not shown). The moving device 30 can be substantially slidably engaged with the two support bodies 13 along the first direction X. The tool changer 25 can be positioned on one side of the moving device 30 towards the base 11 for supplying tools or cutters. The tool changer 25 can push a tool frame for the feeding device 50 changing tools under a control of the controller 60, when the feeding device 50 needs to change a tool.

The feeding device 50 can be slidably on the moving device 30. The feeding device 50 can include a sliding member 51, a main shaft 53, a tool holding assembly 55, and a locking assembly 57. The sliding member 51 can be slidably positioned on the moving device 30. The main shaft 53 can be fixed on the sliding member 51. The tool holding assembly 55 can be mounted on one end of the main shaft 53 for lathing or milling a workpiece. The locking assembly 57 can be fixed on the sliding member 51 and lock the tool holding assembly 55.

Figure 3:
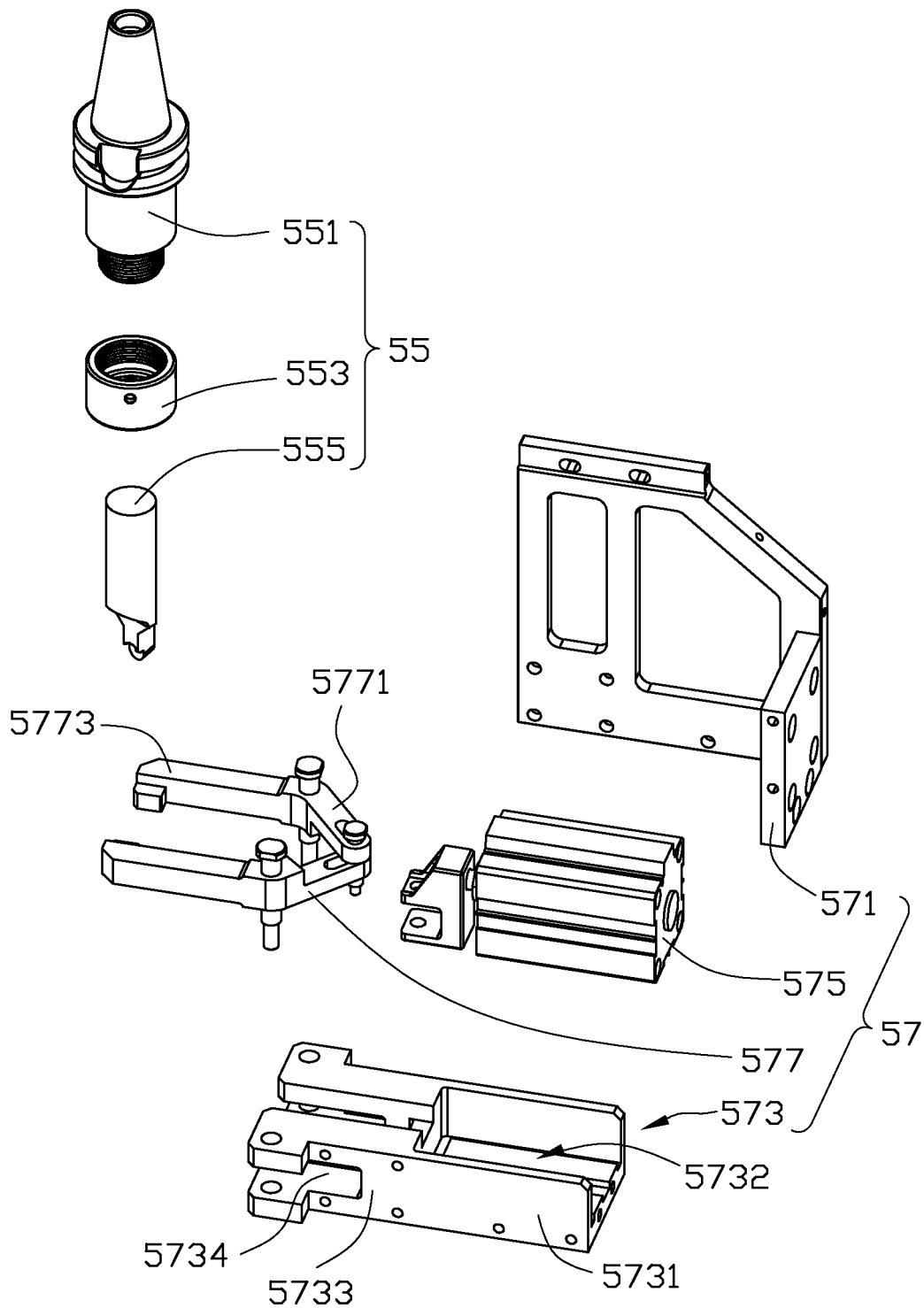
FIG. 3 illustrates an assembled, isometric view of the tool holding assembly and the locking assembly of FIG. 1.
Figure 4:
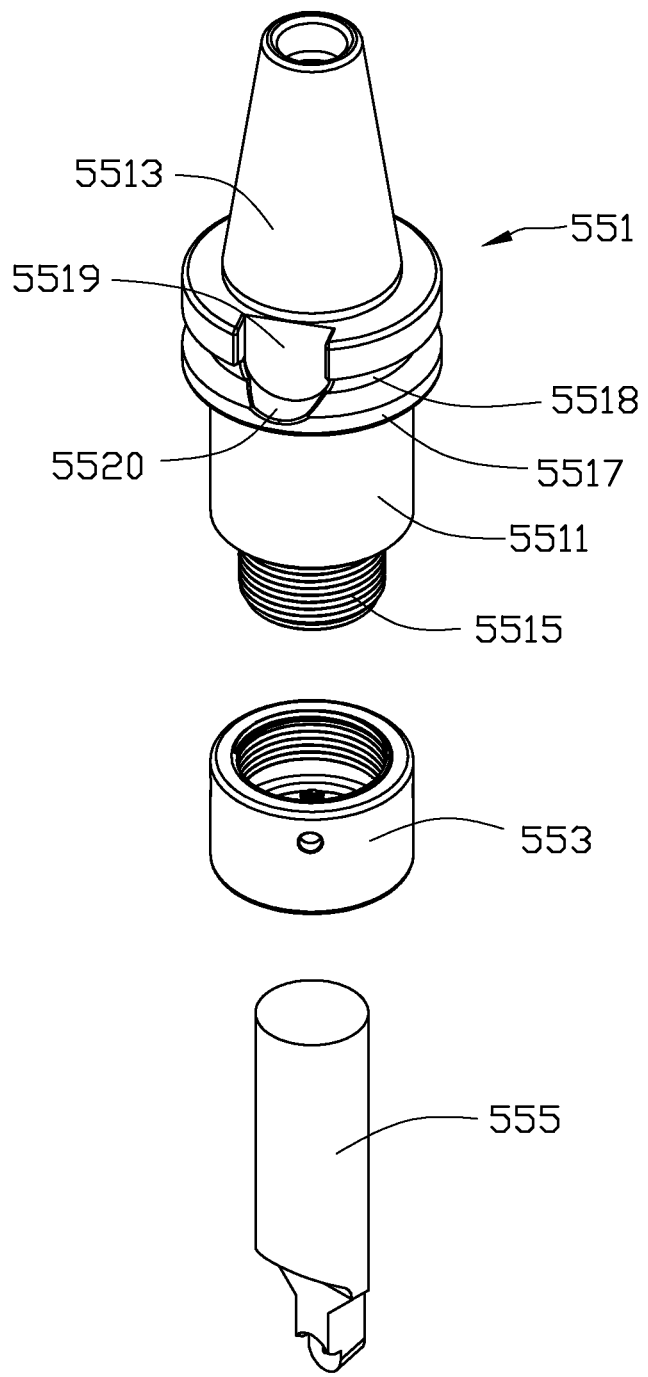
FIG. 4 illustrates an exploded view of the locking assembly of FIG. 3.

The sliding member 51 can include a main body 511 and a holding portion 513 fixedly coupled to one end portion of the main body 511. The main shaft 53 can pass through the holding portion 513. The tool holding assembly 55 can be detachably positioned on one end of the main shaft 53. FIGS. 3 and 4 show that the tool holding assembly 55 can include a connecting member 551, a sleeving member 553, and a tool head 555. The sleeving member 553 can be in a substantial ring shape. The sleeving member 553 can be detachably sleeved on the connecting member 551. The tool head 555 can be partially received in and fixedly held by the sleeving member 553. The tool head 555 can be used for holding a lathe tool or a milling cutter.

The connecting member 551 can include a base body 5511, a conical portion 5513, and a thread portion 5515. The conical portion 5513 can be formed on one end portion of the base body 5511, and the thread portion 5515 can be formed on the other end portion of the base body 5511. The base body 5511, the conical portion 5513, and the thread portion 5515 can be coaxial. A diameter of the conical portion 5513 can be gradually decreased from an end of the conical portion 5513 adjacent to the base body 5511 to another end of the conical portion 5513. The conical portion 5513 can be received in and fixed in the main shaft 53. Two ring-shaped positioning ribs 5517 can separately protrude from an outer surface of the base body 5511 and cooperative form an annular groove 5518. One of the two positioning ribs 5517 can be positioned adjacent to the conical portion 5513. Two clamping grooves 5519 can be separately recessed in the outer surface of the base body 5511 and symmetrically positioned at two sides of a vertical axis of the base body 5511. Each clamping groove 5519 can be recessed in a bottom surface of the annular groove 5518 along a radical direction of the base body 5511. One end portion of each clamping groove 5519 can extend through the positioning rib 5517 adjacent to the conical portion 5513, another end portion of each clamping groove 5519 can extend to another positioning rib 5517 away from the conical portion 5513 so as to form a positioning side surface 5520 in the positioning rib 5517 away from the conical portion 5513. In at least one embodiment, the two clamping grooves 5519 can be not positioned symmetrically at two sides of the vertical axis of the base body 5511, the two clamping grooves 5519 can be just spaced from each other. The sleeving member 553 can be screwed with the thread portion 5515 for assembling the tool head 555 to the connecting member 551. A plurality of tool holding assemblies 55 with corresponding one tool or cutter can be positioned in the tool changer 25 for supplying tools or cutters.

The locking assembly 57 can be fixed on the sliding member 51 and positioned adjacent to the tool holding assembly 55. The locking assembly 57 can include a mounting frame 571, a support member 573, a driving member 575, and a pair of claws 577. The mounting frame 571 can be fixedly mounted on the sliding member 51. The support member 573 can be mounted on the mounting frame 571. The support member 573 can include a support portion 5731 mounted on the mounting frame 571 and two extending portions 5733 separately extending from a same end of the support portion 5731 away from the mounting frame 571. A receiving groove 5732 can be defined in the support portion 5731. A pivoting groove 5734 can be defined in each extending portion 5733 and positioned away from the support portion 5731. The pivoting groove 5734 of each extending portion 5733 can extend through an end surface of the extending portion 5733 away from the support portion 5731 and two opposite side surfaces of the extending portion 5733. The driving member 575 can be received and positioned in the receiving groove 5732.

Each of the pair of claws 577 can pass through and be pivoted in corresponding one pivoting groove 5734 and rotatably coupled with the driving member 575. Each claw 577 can include a connecting portion 5771 and a locking portion 5773 extending from the connecting portion 5771 away from the driving member 575. The connecting portion 5771 can intersect with the locking portion 5773, and an obtuse degree can be formed between the connecting portion 5771 and the locking portion 5773. A joint of each claw 577, where is the connecting portion 5771 intersecting with the locking portion 5773, can be received in one pivoting groove 5734. One end of each connecting portion 5771 away from the locking portion 5773 can be pivoted with the driving member 575. A shape of an end of each locking portion 5773 away from the connecting portion can fit over the clamping groove 5519. The pair of claws 577 can be driven to move towards each other for clamped into corresponding one clamping groove 5519 by the driving member 575 so as to stop a rotation of the tool holding assembly 55.

In assembly, the worktable 20 can be positioned on the base 11, the moving device 30 can be slidably positioned on the two supporting bodies 13, the tool changer 25 can be mounted on the moving device 30. The feeding device 50 can be slidably mounted on the feeding device 30. The controller 60 can be positioned on the base 11 and electrically coupled to the work table 20, the moving device 30, the feeding device 50. In feeding device 50 assembly, the sliding member 51 can be slidably positioned on the moving device 30, the main shaft 53 can be positioned on the holding portion 513, the tool holding assembly 55 can be mounted on the main shaft 53. The locking assembly 57 can be fixed on the sliding member 51 adjacent to the tool holding assembly 55. Each claw 577 can be faced to corresponding one clamping groove 5519. A lathe tool or a milling cutter can be assembled to the tool head 555.

In other embodiments, the number of the clamping grooves 5519 can be three, or more, the clamping grooves 551 can be arranged around a round surface of the base body 5511. A shape of the locking portion 5573 can fit over a shape of the round surface of the base body 5511. A plurality of locking blocks (not shown) can be positioned on the locking portion 5773 corresponding to the clamping grooves 5519.

Figure 5:
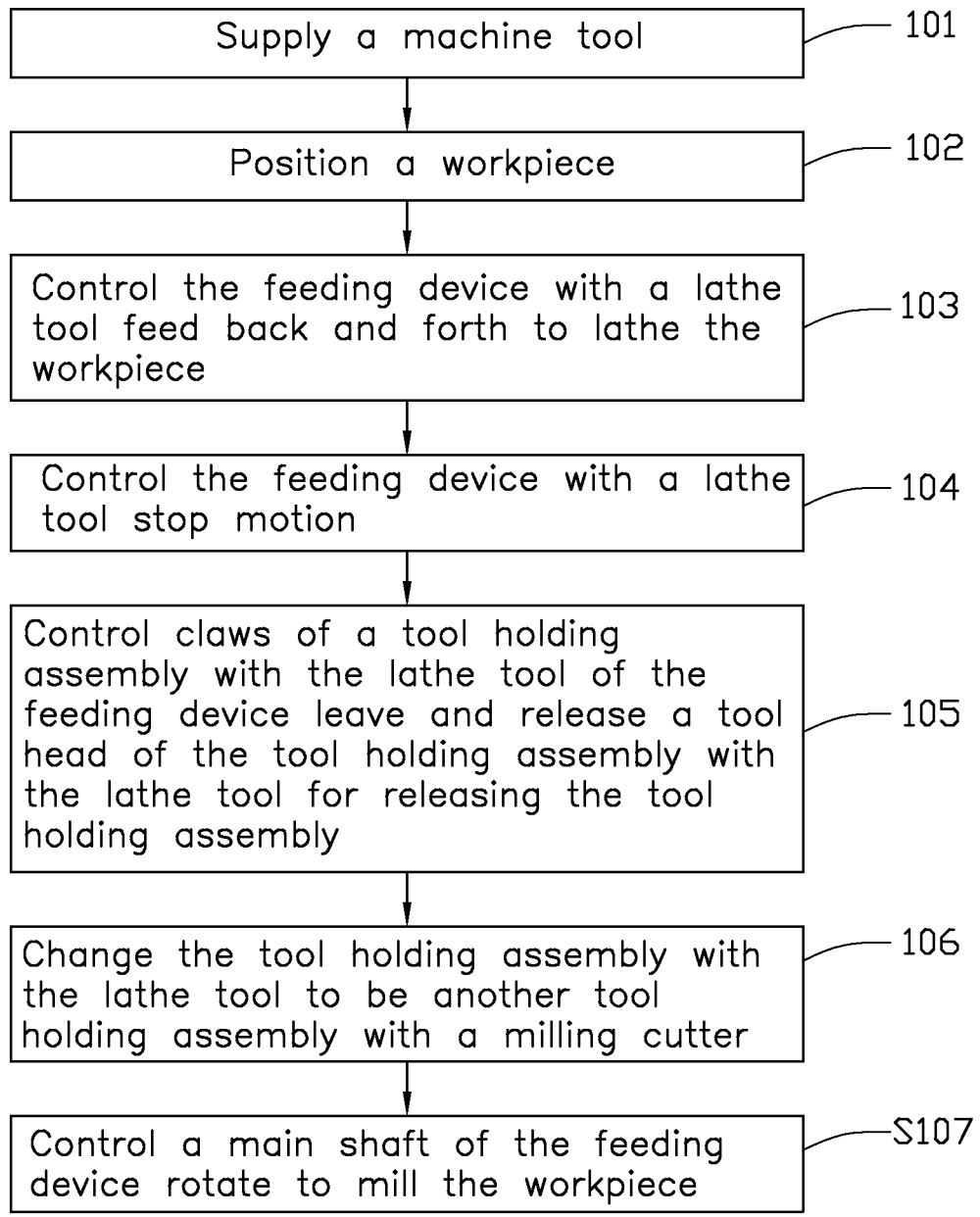
FIG. 5 illustrates a process for machining using the machine tool of FIG. 1.

Referring to FIG. 5, a flowchart is presented in accordance with an example embodiment which is being thus illustrated. The example method is provided by way of example, as there are a variety of ways to carry out the method. The method described below can be carried out using the configurations illustrated in FIGS. 1 through 4, for example, and various elements of these figures are referenced in explaining example method. Each block shown in FIG. 5 represents one or more processes, methods or subroutines, carried out in the exemplary method. Additionally, the illustrated order of blocks is by example only and the order of the blocks can change according to the present disclosure. The exemplary method can begin at block 101.

In block 101, a machine tool is supplied, and the machine tool can include a machine bed, a worktable positioned on the machine bed, a moving device movably positioned on the machine bed along a first direction, a tool changer, a feeding device, a locking assembly, and a controller. The tool changer is used for holding a plurality of tool holding assemblies. The tool changer is positioned on a side of the moving device towards the machine bed, each of the plurality of tool holding assemblies can hold a tool or a cutter.

The feeding device is slidably positioned on the moving device along a second direction substantially perpendicularly to the first direction. The feeding device can feed back and forth along a direction substantially perpendicular to the first direction and the second direction. The feeding device can include a sliding member; a main shaft positioned on the sliding member, a tool holding assembly positioned on the main shaft, the tool holding assembly. The tool holding assembly can include a connecting member detachably positioned on the main shaft and a tool head positioned on the connecting member and configured for holding a tool or a cutter. At least two clamping grooves are defined in the tool head. The locking assembly can be positioned on the sliding member separately from the tool holding assembly. The locking assembly can include a driving member coupled to the sliding member and a pair of claws coupled to the driving member. The pair of claws can be engaged with the two clamping grooves for locking the tool holding assembly pre-positioned on the feeding device. The moving device can move to the tool changer for changing and holding another tool holding assembly after the pair of claws are driven to leave the two clamping grooves and release the tool holding assembly by the driving member. The controller can be electrically coupled to the worktable, the moving device, and the feeding device.

In block 102, the workpiece can be positioned at the worktable.

In block 103, the workpiece can be rotated by the worktable, the tool holding assembly with a lathe tool can be moved to feed back and forth along the third direction by the feeding device for lathing the workpiece.

In block 104, the tool holding assembly can be controlled to stop motion by the controller of the machine tool.

In block 105, the locking portions of the claws can leave and release the tool head for releasing the tool holding assembly under a control of the controller .

In block 106, the lathe tool can be changed to be a milling cutter. In detail, a tool frame of the tool changer can be pushed out by the tool changer, the tool holding assembly can be moved above the tool frame by the feeding device and inserted into the tool frame by the main shaft, the tool holding assembly can be released, the main shaft can be moved towards another tool holding assembly with a milling cutter above the tool frame, then the main shaft can move downwards and sleeved on another tool holding assembly with the milling cutter holder by the tool changer, such that the tool holding assembly with the milling cutter can be latched and fixed on the main shaft. In other embodiments, some latching structures can be positioned on the tool head, a cutter can be directly detached from the tool head and released in the tool changer. The tool head can press the milling cutter, then the milling cutter can be fixed and clamped by the latching structure.

In block 107, the milling cutter can be rotated by the main shaft for milling the workpiece.

A lathing process of the machine tool can be changed to be a milling process because the tool holding assembly can be be locked by the locking assembly from a rotation. The workpiece can be not transferred from different machine tools or different machining positions.

In other embodiments, the workpiece can be firstly machined by the milling cutter, the main shaft can rotate the tool holding assembly with a milling cutter, then the main shaft can stop rotation and the milling cutter can be changed to be the lathe tool, the controller can control the claws be locked by corresponding one clamping groove. In detail, the driving member can drive the two claws to rotate and close each other, such that he claw be locked by corresponding one fastening groove. The worktable can rotate the workpiece and the tool holding assembly with a lathe tool can be moved back and forth along the third direction by the feeding device for lathing the workpiece. The tools or cutters are not limited to be the lathe tool or the milling cutter, they can be other types cutters, such as a scraping cutter.

The embodiments shown and described above are only examples. Many details are often found in the art such as the other features of a feeding device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A feeding device comprising:
   a sliding member slidably couplable to a moving member;
   a main shaft rotatably coupled with the sliding member;
   a tool holding assembly, the tool holding assembly having
      a connecting member detachably connectable to the main shaft, and the tool holding assembly being configured for holding one of a plurality of tool heads, the connecting member defining two clamping grooves; and
   a locking assembly positioned on the sliding member and having a driving member attached to the sliding member, and the locking assembly having a pair of claws attached to the driving member, wherein each of the claws has a respective locking portion;
   wherein, the driving member is configured to cause the locking portions to move towards and away from one another so as to move the locking portions between an engaged position in which the locking portions of the pair of claws are engaged with the two clamping grooves of the connecting member that holds one of the plurality of tool heads to lock the one tool head in place to prevent rotation of the main shaft, and a released position in which the locking portions of the pair of claws are disengaged from the two clamping grooves releasing the connecting member that holds the one tool head to permit rotation of the main shaft.

2. The feeding device of claim 1, wherein the tool holding assembly further comprises a sleeving member detachably sleeved on the connecting member.

3. The feeding device of claim 2, wherein the connecting member comprises a base body, a conical portion, and a thread portion, the conical portion is formed on one end portion of the base body, and the thread portion is formed on another end portion of the base body, the conical portion is received in the main shaft, and the sleeving member is screwed with the thread portion, and the two clamping grooves are separately recessed in an outer surface of the base body.

4. The feeding device of claim 3, wherein two ring-shaped positioning ribs separately protrude from an outer surface of the base body and cooperative to form an annular groove, and the two clamping grooves are recessed in a bottom surface of the annular groove.

5. The feeding device of claim 1, wherein the two clamping grooves are symmetrically positioned on a round flange of the connecting member.

6. The feeding device of claim 1, wherein the locking assembly further comprises a mounting frame and a support member, the mounting frame is fixedly mounted on the sliding member, and the support member is mounted on the mounting frame, and the driving member is positioned on the support member.

7. The feeding device of claim 6, wherein the support member comprises:
   a support portion mounted on the mounting frame; and
   two extending portions separately extending from a same end of the support portion in a direction away from the mounting frame, and
   wherein a portion of a respective one of each of the two claws is received in a corresponding respective one of the extending portions.

8. The feeding device of claim 7, wherein a respective pivoting groove is defined in each of the extending portions and is positioned away from the support portion, and wherein a portion of a respective one of each of the two claws is pivoted in a corresponding respective one of the pivoting grooves and is rotatably coupled with the driving member.

9. The feeding device of claim 6, wherein the support member defines a receiving groove, and the driving member is received in the receiving groove.

10. The feeding device of claim 1,
    wherein each claw of the pair of claws comprises a respective connecting portion, and
    wherein the respective locking portion of each of the claws extends from the respective connecting portion away from the driving member,
    wherein the connecting portions are each coupled to the driving member, and
    wherein each of the locking portions is engaged with a corresponding one of the clamping grooves.

11. The feeding device of claim 10, wherein each of the connecting portions intersects with a respective one of the locking portions, and an obtuse angle is formed between each of the connecting portions and the respective corresponding locking portion.

12. A machine tool, comprising:
    a machine bed;
    a worktable positioned on the machine bed;
    a moving device movably positioned on the machine bed for movement along a first direction;
    a feeding device comprising:
      a sliding member slidably couplable to a moving member;
      a main shaft rotatably coupled with the sliding member;
      a tool holding assembly, the tool holding assembly having a connecting member detachably connectable to the main shaft, and the tool holding assembly being configured for holding one of a plurality of tool heads, each of the tool heads comprising a respective tool or a respective cutter, the connecting member defining two clamping grooves; and
      a locking assembly positioned on the sliding member and having a driving member attached to the sliding member, and the locking assembly having a pair of claws attached to the driving member, wherein each of the claws has a respective locking portion;
      wherein, the driving member is configured to cause the locking portions to move towards and away from one another so as to move the locking portions between an engaged position in which the locking portions of the pair of claws are engaged with the two clamping grooves of the connecting member that holds one of the plurality of tool heads to lock the one tool head in place to prevent rotation of the main shaft, and a released position in which the locking portions of the pair of claws are disengaged from the two clamping grooves releasing the connecting member that holds the one tool head to permit rotation of the main shaft; and
    wherein the feeding device is slidably positioned on the moving device for movement along a second direction substantially perpendicularly to the first direction and configured to feed the one tool head back and forth along a third direction substantially perpendicular to the first direction and the second direction, the feeding device; and
    the machine tool further comprising:
    a tool changer positioned on a side of the moving device and configured to hold a plurality of the tool holding assemblies; and
    a controller electrically coupled to the worktable, the moving device, and the feeding device.

13. The machine tool of claim 12, wherein the machine bed comprises a base and two support bodies positioned on the base, the worktable is positioned between the two support bodies, and the moving device is slidably positioned on the two support bodies.

14. The machine tool of claim 12, wherein each of the tool holding assemblies further comprises a respective sleeving member detachably sleeved on the respective connecting member.

15. The machine tool of claim 14, wherein each of the connecting members comprises a respective base body, a respective conical portion, and a respective thread portion, wherein each of the conical portions is formed on a respective one end portion of a respective one of the base bodies, and each of the thread portions is formed on a respective another end portion of a respective one of the base bodies, each of the conical portions is selectively receivable in the main shaft, and each of the sleeving members is screwed with a respective one of the thread portions, and each respective two clamping grooves defined by each of the connecting members are separately recessed in an outer surface of the respective base body.

16. The machine tool of claim 15, wherein two ring-shaped positioning ribs separately protrude from an outer surface of each of the respective base bodies and cooperative to form a respective annular groove, and each respective two clamping grooves defined by each of the connecting members are recessed in a bottom surface of the respective annular groove.

17. The machine tool of claim 12, wherein each respective two clamping grooves are symmetrically positioned on a round flange of the respective connecting member.

18. The machine tool of claim 12, wherein the locking assembly further comprises a mounting frame and a support member, the mounting frame is fixedly mounted on the sliding member, and the support member is mounted on the mounting frame, and the driving member is positioned on the support member.

19. The machine tool of claim 18, wherein the support member comprises:
    a support portion mounted on the mounting frame; and
    two extending portions separately extending from a same end of the support portion in a direction away from the mounting frame, and wherein a portion of a respective one of each of the two claws is received in a corresponding respective one of the extending portions.

* * * * *